(12) United States Patent
Shin et al.

(10) Patent No.: US 10,196,522 B2
(45) Date of Patent: Feb. 5, 2019

(54) METHOD OF SEPARATING OIL-SOLUBLE PIGMENT AND WATER-SOLUBLE PIGMENT FROM NATURAL MATERIAL USING AEROGELS AND AN APPARATUS THEREFOR

(71) Applicant: ARCA EIR INC., Daegu (KR)

(72) Inventors: Byong Cheol Shin, Daejeon (KR); Bo Ram Han, Daejeon (KR); Su Jin Lim, Cheonan-si (KR); Hark Mo Seong, Cheongju-si (KR)

(73) Assignee: ARCA EIR INC. (KR)

( * ) Notice: Subject to any disclaimer, the term of this patent is extended or adjusted under 35 U.S.C. 154(b) by 0 days.

(21) Appl. No.: 15/627,600

(22) Filed: Jun. 20, 2017

(65) Prior Publication Data

US 2018/0142101 A1    May 24, 2018

Related U.S. Application Data

(63) Continuation of application No. PCT/KR2016/013383, filed on Nov. 21, 2016.

(30) Foreign Application Priority Data

Nov. 18, 2016    (KR) .................. 10-2016-0153668

(51) Int. Cl.
| | |
|---|---|
| *C09B 67/00* | (2006.01) |
| *C09B 67/54* | (2006.01) |
| *B01J 20/28* | (2006.01) |
| *B01D 11/02* | (2006.01) |
| *B01D 17/02* | (2006.01) |
| *C09B 61/00* | (2006.01) |

(52) U.S. Cl.
CPC ...... *C09B 67/0096* (2013.01); *B01D 11/0288* (2013.01); *B01D 17/0202* (2013.01); *B01J 20/28047* (2013.01); *C09B 61/00* (2013.01)

(58) Field of Classification Search
CPC .................................................. C09B 67/0096
USPC .......................................................... 549/403
See application file for complete search history.

(56) References Cited

PUBLICATIONS

Love, Separation Science and Technology, 40: 31 1-320, 2005.*
Zhao, Angewandte Chemie International Edition, 2018, 10.1002/anie.201709014.*
Crini, Prog. Polym. Sci. 2008, 33, 399-447.*
Wang, J. Sol-Gel Sci.Technol. 2015, 76, 501-509.*

* cited by examiner

*Primary Examiner* — Nizal S Chandrakumar
(74) *Attorney, Agent, or Firm* — Park & Associates IP Law, P.C.

(57) ABSTRACT

A method of separating oil-soluble pigment and water-soluble pigment from natural material using aerogels characterized in comprising the steps of: (A) immersing a natural material in a leaching solvent to extract a pigment; (B) mixing the leaching solution from which pigment is extracted in step (A) with aerogel to adsorb oil-soluble pigment to aerogels; (C) separating oil-soluble pigment adsorbed on the surface of aerogel in step (B); (D) drying and concentrating the pigment separated in step (C), enhancing a method of separating from natural material the initial substance for pharmaceuticals, food, cosmetics, etc. facilitating a safer and more efficient production process compared to the conventional separation method.

4 Claims, 11 Drawing Sheets

METHOD OF SEPARATING OIL-SOLUBLE PIGMENT AND WATER-SOLUBLE PIGMENT FROM NATURAL MATERIAL USING AEROGELS AND AN APPARATUS THEREFOR

REFERENCE TO RELATED APPLICATIONS

This is a continuation of pending International Patent Application PCT/KR2016/013383 filed on Nov. 21, 2016, which designates the United States and claims priority of Korean Patent Application No. 10-2016-0153668 filed on Nov. 18, 2016, the entire contents of which are incorporated herein by reference.

FIELD OF THE INVENTION

The present invention relates to a method of separating oil-soluble pigment and water-soluble pigment from natural material using aerogels and an apparatus therefor. More particularly, the present invention relates to a method of adsorbing and separating an oil-soluble substance by mixing pigment extract liquid separated from natural material with hydrophobic aerogel, and applying carbon dioxide with a predetermined pressure.

BACKGROUND OF THE INVENTION

Aerogel is a synthetic porous ultralight material and advanced material of transparent ultra-low density having a porosity of 90-99.8% and specific surface area of several hundreds to a maximum of 1500 $m^2/g$. The aerogel, originally manufactured by Steven Kistler in 1931, has been prepared by replacing liquid with gas without causing contraction in the state of being gel. It is also called frozen smoke, solid smoke, solid air or blue smoke since it disperses light in the gel even though it is semi-transparent.

Such a porous aerogel can be widely used for manufacturing ultra-low dielectric material, a catalyst, a carrier of the catalyst, an insulating material, electrode material, and sound-proof material. In particular, silica aerogel is expected to be useful as a transparent insulating material due to its high translucency and low thermal conductivity, and also has a high potential as a superior insulating material for refrigerators and window insulation material of aircraft, spacecraft, etc. This remarkable thermal insulation of the aerogel is caused by its ability to neutralize three ways of heat transfer such as convection, conduction, and radiation.

Aerogel can be made hydrophobic by chemical treatment, in order to prevent structural changes such as shrinkage and decomposition which can occur when absorbing water. In addition, if the inner part of the aerogel is made hydrophobic, waterjet cutting procedure also becomes possible in spite of generation of rather deep crack due to its hydrophobicity.

Recently, such porous structure and hydrophobicity of aerogels have been used to absorb hydrophobic material. Researchers in New Jersey Institute of Technology and Arizona State University in the US reported that aerogel functions like sponge to remove oil from waste water, so as to effectively absorb oil spilled into the environment. Also Mercouri Kanatzidis and his colleagues of Northwestern University of Illinois have used aerogel to absorb heavy metals contained in effluents from the polluted industrial area.

On the other hand, the most conventional way to separate specific oil-soluble and water-soluble substances from natural material is using solvents. To separate and purify oil-soluble material, an organic solvent extraction method is used wherein nonpolar (oil-soluble) solvent such as ether, benzene, or benzol can be used. Though such a nonpolar solvent is very efficient for separating hydrophobic material, it causes symptoms such as headache, dizziness, excitement, nausea, vomiting, drowsiness, etc. And long-term exposal thereto may lead severe damage to the body, like disorders in central nervous system and blood cancer.

In addition to the fact that efficient nonpolar solvent should be cautiously treated due to strong inflammability, most of the nonpolar solvents are classified as carcinogen. Accordingly, the process using such a solvent should be taken place out of GMP (Good Manufacturing Practice) facility. The GMP is a certificate acknowledging an excellent food and pharmaceutical manufacturing and quality control system, which is a systematic standard for the production and quality management throughout the whole process related to the structure of the production facilities, purchase of raw materials, production, packaging and shipment with an aim to produce safe and high-quality food and pharmaceuticals. In the US and European countries, the GMP is widely applied as a standard for guaranteeing that food and pharmaceuticals are produced in conformity with the prescribed rules in terms of safety, identity, strength, quality, purity, etc. Considering this, it is necessary to comply with the regulations and standard of the GMP when dealing with material directly affecting the human body such as pharmaceuticals, food, etc.

Currently, the extraction process is separated into two stages; the initial stage of material purification is taken place outside the GMP facility and the following stage is held in the GMP facility. As a result, not only does it cost a lot of production fee, it takes more time to complete the procedure due to the division of the process. Accordingly, to make it possible to perform the entire raw material extraction procedure in the GMP facility, a physical process that can replace the organic chemical extraction purification method is required to achieve a stable, efficient, economic extraction procedure.

SUMMARY OF THE INVENTION

The present invention is aimed to provide a method of performing raw material purification procedure more efficiently and safely. The conventional procedure using nonpolar solvent has problems as follows: the method of separating oil-soluble carotenoids and polar flavonoids from natural material using nonpolar solvent is harmful to the human body; it is difficult to manage safely because of flammability of the solvent; and the raw material purification procedure has to be taken place outside the GMP facility. The present invention may provide a more efficient and safer method of practicing the raw material purification procedure.

The present invention provides a method of separating oil-soluble pigment and water-soluble pigment from natural material using aerogels comprising the steps of: (A) immersing a natural material in a leaching solvent to extract a pigment; (B) mixing the leaching solution from which pigment is extracted in step (A) with aerogels to adsorb oil-soluble pigment to aerogels; (C) separating oil-soluble pigment adsorbed on the surface of aerogel in step (B); (D) drying and concentrating the pigment separated in step (C).

The method of separating oil-soluble pigment and water-soluble pigment from natural material using aerogels further comprises the steps of (E) separating water-soluble pigment which is not adsorbed on the surface of aerogel after the step (B); and (F) drying and concentrating the water-soluble pigment from step (E). The step (B) of adsorbing oil-soluble pigment to aerogels is performed under the condition that carbon dioxide partial pressure is 36-44 mmHg.

As one embodiment of the present invention, provided is an apparatus for separating oil-soluble pigment and water-soluble pigment from natural material using aerogels characterized in comprising: a natural material tank for extracting pigment from natural material; an adsorption tank connected to the natural r leaching solution leached from the natural material tank is mixed with aerogel to react; a pigment separation tank which receives aerogel adsorbed with oil-soluble pigment from the adsorption tank and separates oil-soluble pigment using organic solvent; and a regeneration tank which receives waste aerogels from the pigment separation tank and volatilizes the organic solvent.

Provided is an apparatus for separating oil-soluble pigment and water-soluble pigment from natural material using aerogels, wherein the pigment separation tank is mounted with a cooler for maintaining the temperature of the tank at −20° C., and the pigment separation tank and the regeneration tank are provided with a heater for removing the organic solvent.

The method of separating oil-soluble pigment and water-soluble pigment from natural material using aerogels and the apparatus therefor improve a method of separating initial substances from natural material for preparing pharmaceuticals, food, cosmetics, etc., facilitating a safe and efficient procedure.

DETAILED DESCRIPTION OF THE INVENTION

The objective of the present invention is to provide a method of separating oil-soluble substance from natural materials. In general, in order to produce a basic source for cosmetics, health food, pharmaceuticals, etc. from natural material, an organic solvent is used to purify oil-soluble and water-soluble material. The most commonly used nonpolar solvent is mostly highly inflammable and difficult to be safely dealt with, and is very harmful to the human body.

A representative organic solvent, ether, is a highly volatile and anesthetic colorless liquid which is very harmful to the human body. The vapor thereof, heavier than air, is likely to spread to the bottom of the production facility, causing a risk of fire.

In addition, the current inspection and testing standards for medicines are in line with those of the Korean Food and Drug Administration. However they only determine the content criteria, but fail to provide a standard for actual purification method. With regulations at home and abroad becoming strict, separation of the production procedure to comply with the GMP regulation leads to increase of the production cost.

The present invention provides a safer and more effective methodological standard for purifying natural materials, and also provides a comprehensive production standard for producing API such as flavonoid and carotinoid. Hereinafter, the present invention will be described in more detail with reference to specific examples.

I. Extraction of Pigment Mixture Liquid from Natural Materials

Figure 1:
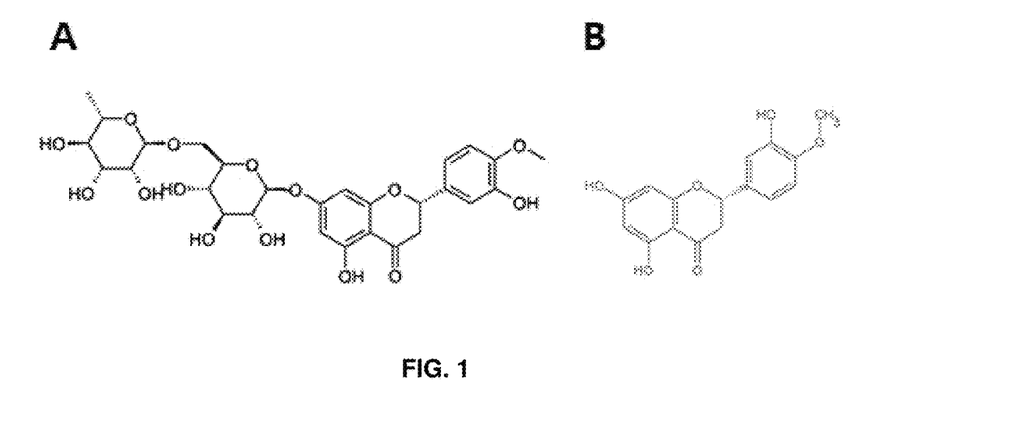
FIG. 1 represents the molecular structures of hesperidin (A) and hesperetin (B).

As one embodiment of the present invention, a water-soluble pigment, hesperidin ($C_{28}H_{34}O_{15}$) and an oil-soluble pigment, hesperetin ($C_{16}H_{14}O_6$) are separated and purified from Jeju citrus fruits peel. Hesperidin is water-soluble flavonoid with a molecular weight of 610 g/mol, and hesperetin is oil-soluble carotenoid with a molecular weight of 302 g/mol. FIG. 1 shows the molecular structure of hesperidin and hesperitin.

To isolate the water-soluble pigment and the oil-soluble pigment from Jeju citrus fruits, initially a pigment mixture liquid is extracted from citrus fruit peel. 1.8 kg of dried Jeju citrus fruit peel is crushed and immersed in a leaching solvent such that the peel is submerged for 30 days, wherein the leaching solution is 95% alcohol. Following the immersion step, a pigment mixture solution is obtained in which pigment of citrus fruit peel is mixed with the immersion liquid and extracted. Then, the resulting extract is filtered through a 0.45 nm membrane filter to remove impurities.

II. Comparison Experiment of Extraction Efficiency of Water-Soluble Flavonoid, Hesperidin 1. Ether Extraction from a Pigment Mixture 500 ml of ether was mixed with 1 L of the pigment mixture solution from which impurities are removed, followed by stirring (200 rpm). The well-stirred mixture was placed in a burette and separated in layers to isolate the ethanol layer except ether. From the separated ethanol layer, 500 g of the ethanol layer is concentrated in a reduced pressure at −20° C. for 5 hours, and crystalized to test for water-soluble flavonoid hesperidin.

2. Purification Using an Aerogel from a Pigment Mixture Solution

1 L of citrus fruit peel extract from which impurities are filtered in the above procedure of extraction of pigment mixture liquid from natural materials is added with 2 g of aerogel 1-20 μm (Silica aerogel, REMTECH, KOREA) and mixed to the degree that dissolved carbon dioxide ($CO_2$) is detected as to 10% (5,000 ppm) and allowed to stand for 3 days. To perform ionization reaction of extraction solvent and physically disperse the contained material, carbon dioxide is injected into the reaction tank and airtightly sealed to react, wherein the partial pressure of carbon dioxide is 36-44 mmHg and the density is 3, 150 mg/cm$^3$. In this process, the oil-soluble pigment is adsorbed on the porous surface of aerogels and the water-soluble pigment remains in the solution.

After 3 days, ethanol extract is filtered through hollow fiber membrane filter of 1.2 nm to remove impurities including aerogels and from the ethanol extract layer, 500 g of the ethanol extract is concentrated in a reduced pressure at −20° C. for 5 hours, and crystallized to test for water-soluble flavonoid hesperidin.

3. Comparison of Ether Extraction Method and Aerogel Purification Method

In order to compare the content of flavonoid hesperidin purified respectively with the extraction method and the aerogel purification method, the crystallization materials prepared from the previous step are diluted in methanol in 1, 5, 10, 15, and 20% of concentration, wherein the standard hesperidin for the test is 98≤ purchased from Sigma, SHIMADZU UFLC was used for the test, Column is C18 column (5 um), flow rate is 1 ml/min, wavelength is 280 nm, mobile phase (Methanol:water) is 3:7, and the measurement temperature is 35° C.

Figure 2A:
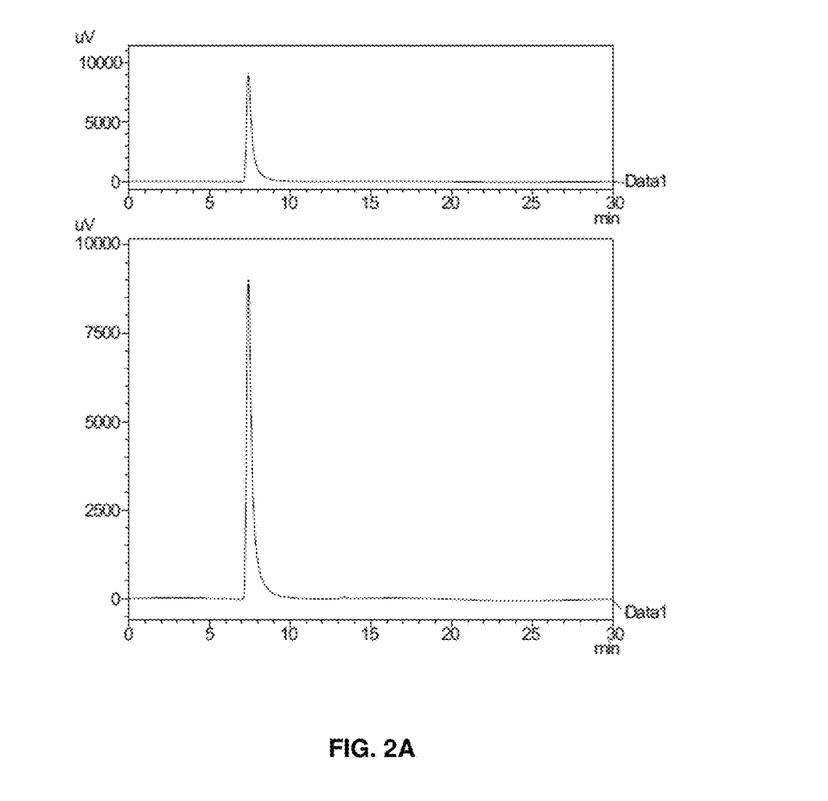
FIG. 2 discloses comparison results of (A) 50 ug hesperidin STD control, and purification efficiency of the flavonoid hesperidin purified respectively by (B) the ether extraction method of 0.0005% of citrus peel ethanol extraction liquid, and (C) the aerogel purification method of 0.0005% of citrus peel ethanol extraction liquid.
Figure 2B:
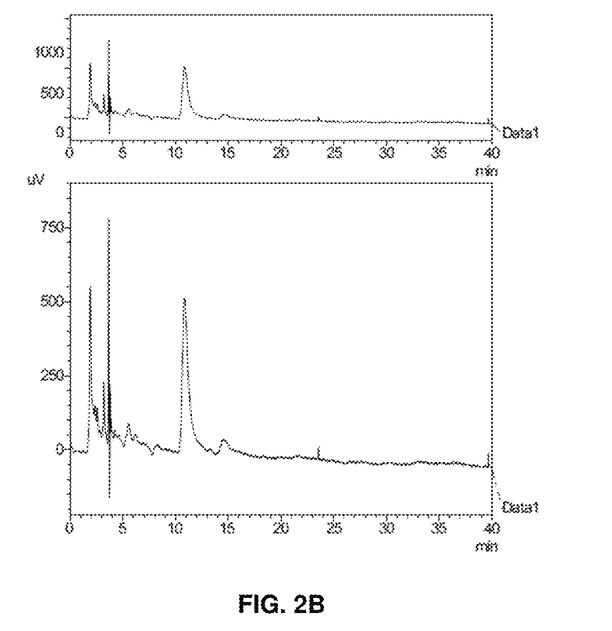
Figure 2C:
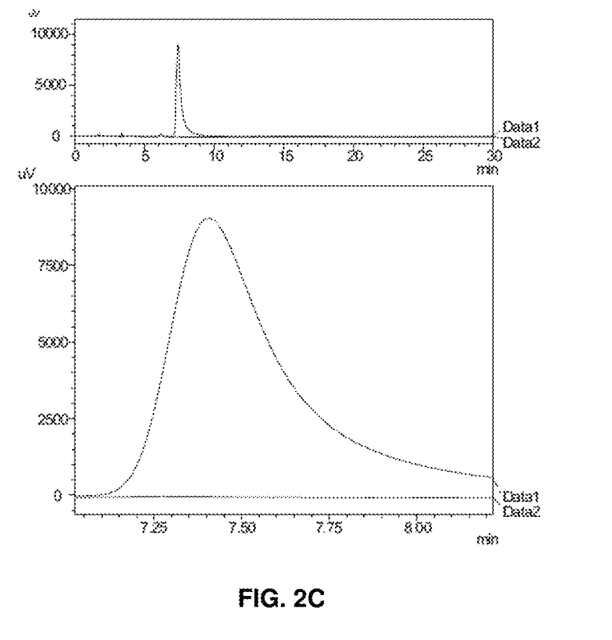

FIG. 2 shows comparison of flavonoid hesperidin contents (each 0.0005%) purified respectively by the ether extraction method (B) and the aerogel purification method (C) with 50 μg of a control (A). As seen in FIG. 2, the peak of hesperidin was shown at an expression time of 7 minutes and 50 seconds.

Figure 3:
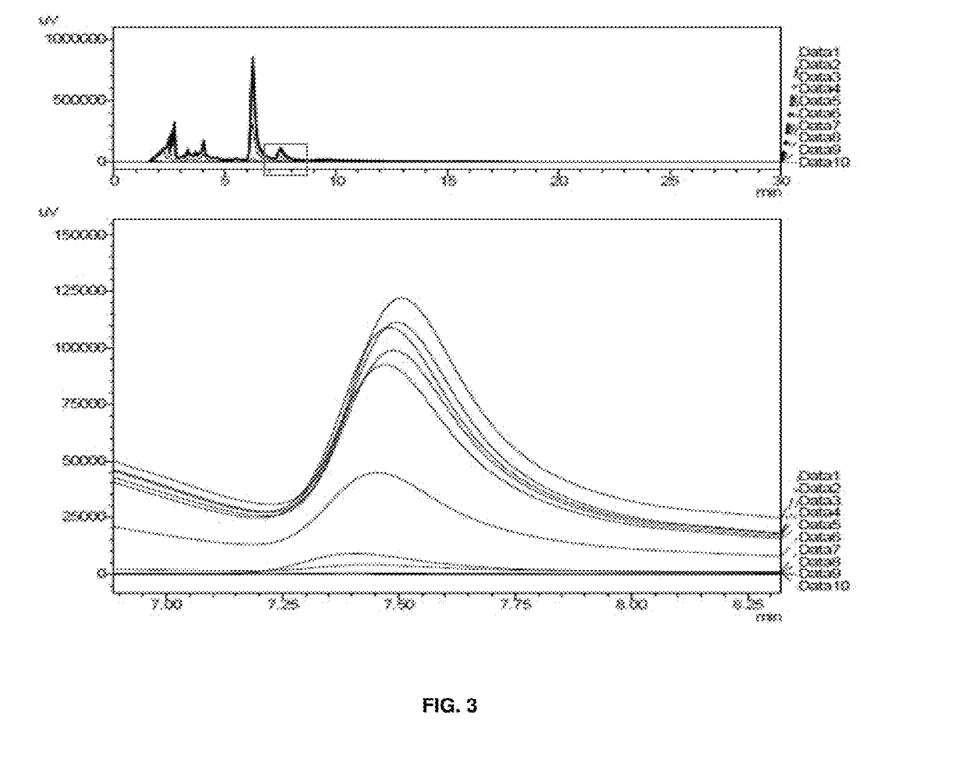
FIG. 3 shows purification efficiency of hesperidin purified respectively by the ether extraction method and the aerogel purification method.

FIG. 3 shows purification efficiency of hesperidin separated respectively by the ether extraction method and the aerogel purification method. The extracts separated by the aerogel purification method were diluted in concentration of 5, 10, 15, and 20%, and the extracted separated by the ether purification method were diluted in concentration of 0.005, 1, 5, 10 and 20%, and the purification efficiency of hesperidin is compared using UFLC. And the results are shown in Table 1.

TABLE 1

| The purification efficiency of hesperidin using UFLC | | |
|---|---|---|
| Data no. | concentration | area(Total) |
| Data 1(Aerogel) | 5% | 3063098 |
| Data 2(Aerogel) | 20% | 4260196 |
| Data 3(Aerogel) | 15% | 3559940 |
| Data 4(Aerogel) | 10% | 3502130 |
| Data 5(Ether) | 20% | 3017274 |

TABLE 1-continued

| The purification efficiency of hesperidin using UFLC | | |
|---|---|---|
| Data no. | concentration | area(Total) |
| Data 6(Ether) | 10% | 1488931 |
| Data 7(Ether) | 5% | 114132 |
| Data 8(Ether) | 1% | 6892 |
| Data 9(Ether) | 0.0005% | — |
| Data 10(Standrad) | 50 ug Hesperidin STD | 226399 |

As shown in FIG. 3 and Table 1, the concentration of hesperidin purified by aerogel purification method was higher than that by the ether extraction method, with a difference of more than 1.5-8 times in the purification efficiency.

III. Comparison Experiments of Extraction Efficiency of Oil-Soluble Carotenoid, Hesperetin 1. Ether Extraction from a Pigment Mixture Solution 150 ml of oil-soluble pigment extracted in ether in the above step II.1 was concentrated under reduced pressure at −20° C. for 5 hours to be crystallized, and then the crystallized pigment was diluted in hexane respectively in 0.0005, 0.005, 0.5, 1.5, 1, 5, 10, 15, and 20% concentration for testing hesperetin.

2. Purification Using Aerogels from Pigment Mixture Solution

In the above step II.2, aerogel immersed in the ethanol extract of citrus fruit peel are obtained and oil-soluble pigment adsorbed on the aerogel is dissolved with hexane. And the purified oil-soluble substance obtained by passing 1-20 μm of aerogel layer (Silica aerogel, REMTECH, KOREA) through hexane is concentrated under reduced pressure at −20° C. for 5 hours to be crystallized. Then, these crystallized substance is diluted with hexane to have a concentration of 0.0005, 0.005, 0.5, 1.5, 1, 5, 10, 15, and 20% for testing hesperetin as in the above 111.1.

3. Comparison of the Ether Extraction Method and the Aerogel Purification Method In order to compare the content of carotenoid hesperetin purified respectively with the ether extraction method and the aerogel purification method, the crystallization materials prepared from the previous step are diluted in methanol in 0.0005, 0.005, 0.5, 1.5, 1, 5, 10, 15, and 20% of concentration, wherein the standard hesperetin for the test is 98, purchased from Waters.

SHIMADZU UFLC was used for the test, which is used in the same condition as in the case of the above water-soluble flavonoid as follows: column is C18 column (5 μm), flow rate is 1 ml/min, wavelength is 280 nm, mobile phase (Hexane:water) is 3:7, and the measurement temperature is 35° C.

Figure 4A:
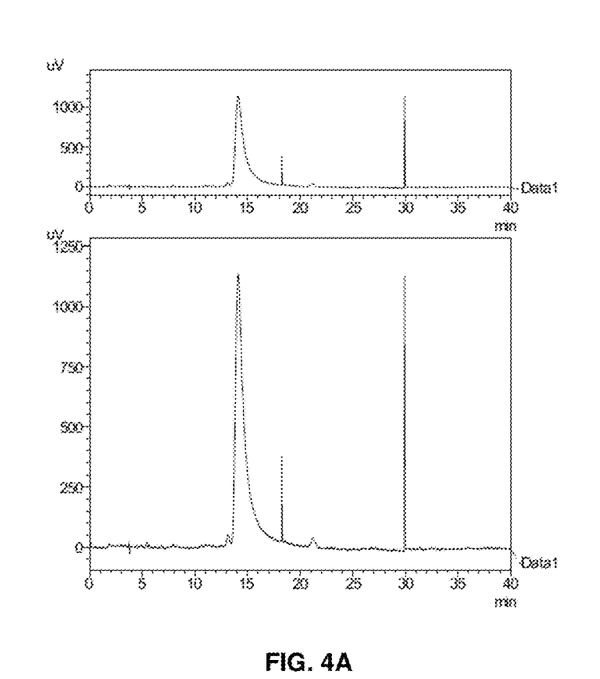
FIG. 4 shows comparison results of (A) 50 ug Hesperetin STD control, and the cartenoid hesperetin purified respectively by (B) the ether extraction method of 5% of citrus peel ether extraction liquid and (C) the aerogel purification method of 5% of hexane-purified citrus peel adsorption liquid.
Figure 4B:
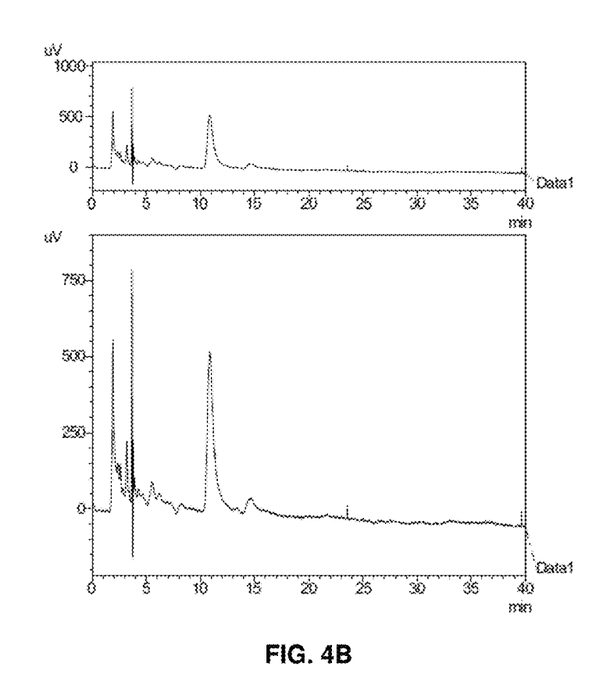
Figure 4C:
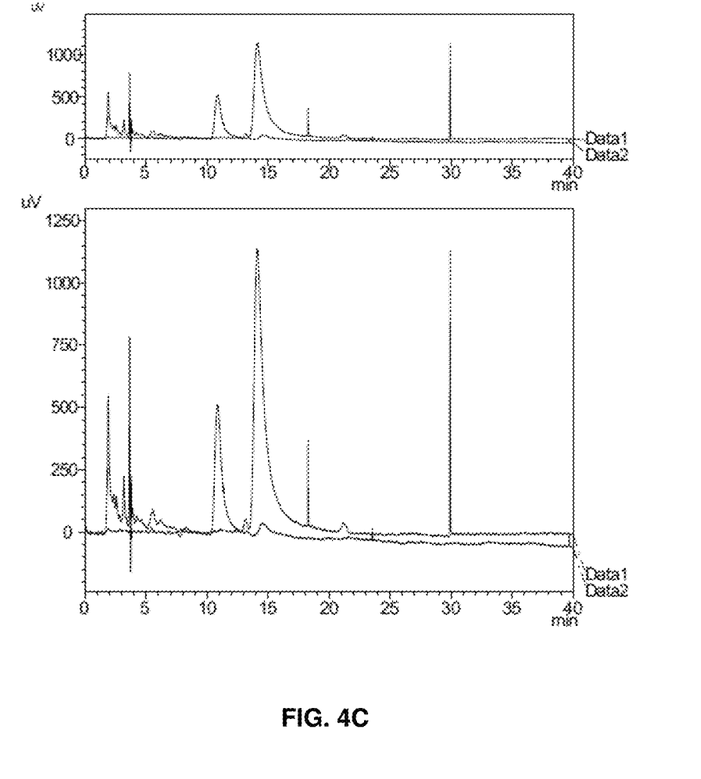

FIG. 4 shows comparison of flavonoid hesperidin contents (each 0.0005%) purified respectively by the ether extraction method (B) and the aerogel purification method (C) with a control (A). As seen in FIG. 4, the peak of hesperetin content was shown at an expression time of 15 minutes and 50 seconds.

Figure 5:
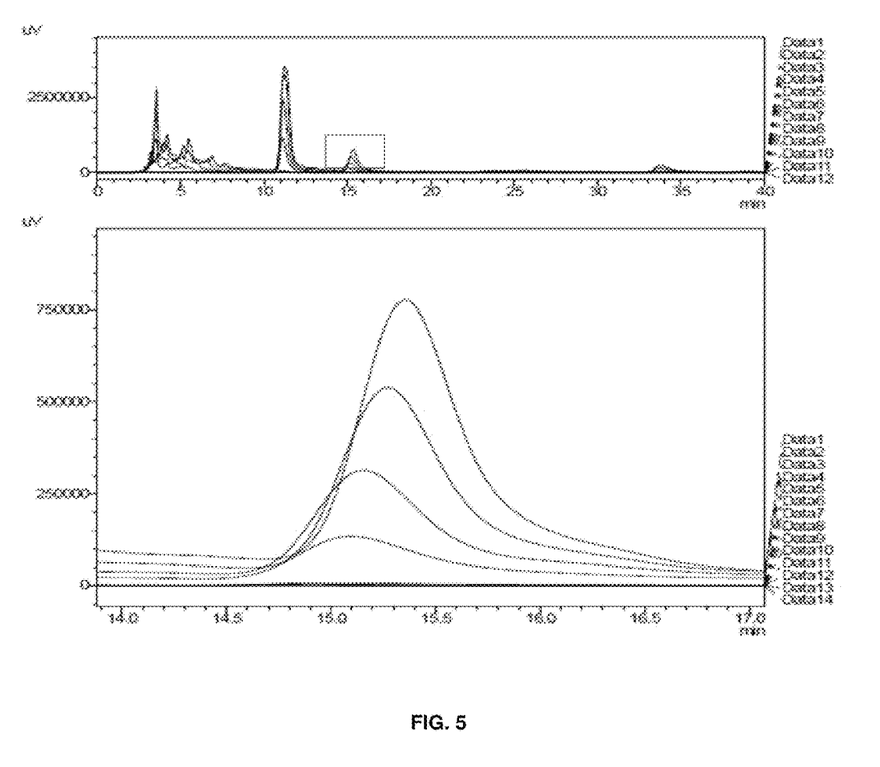
FIG. 5 shows purification efficiency of hesperetin purified by the ether extraction method and the aerogel purification method.

FIG. 5 shows purification efficiency of hesperetin separated respectively by the ether extraction method and the aerogel purification method. The extracts separated by the aerogel purification method were diluted in concentration of 1, 5, 10, 15, and 20%, and the extracts separated by ether purification method were diluted in concentration of 0.005, 1, 5, 10 and 20%, and the purification efficiencies of hesperetin in both cases are compared using UFLC. And the results are shown in Table 2.

TABLE 2

The purification efficiency of hesperetin using UFLC

| Data no. | concentration | area(Total) |
| --- | --- | --- |
| Data 1(Aerogel) | 5% | 9050918 |
| Data 2(Aerogel) | 20% | 34825184 |
| Data 3(Aerogel) | 15% | 27939977 |
| Data 4(Aerogel) | 10% | 23965971 |
| Data 5(Ether) | 20% | 581006 |
| Data 6(Ether) | 15% | 235559 |
| Data 7(Ether) | 10% | 1284 |
| Data 8(Ether) | 5% | 449 |
| Data 9(Ether) | 1% | — |
| Data 10(Aerogel) | 1% | — |
| Data 11(Ether) | 0.5% | — |
| Data 12(Ether) | 0.005% | — |
| Data 13(Ether) | 0.0005% | — |
| Data 14(Standrad) | 50 ug Hesperidin STD | 54807 |

As shown in FIG. 5 and Table 2, the concentration of hesperetin purified by the aerogel purification method (Data 1-4, 10) was higher than that by the ether extraction method (Data 5-9). Compared with the fact that when using the ether extraction method, the separation rate of hesperetin was very low, it was confirmed that hesperetin was successfully adsorbed in higher rate when using the aerogel purification method.

Figure 6:
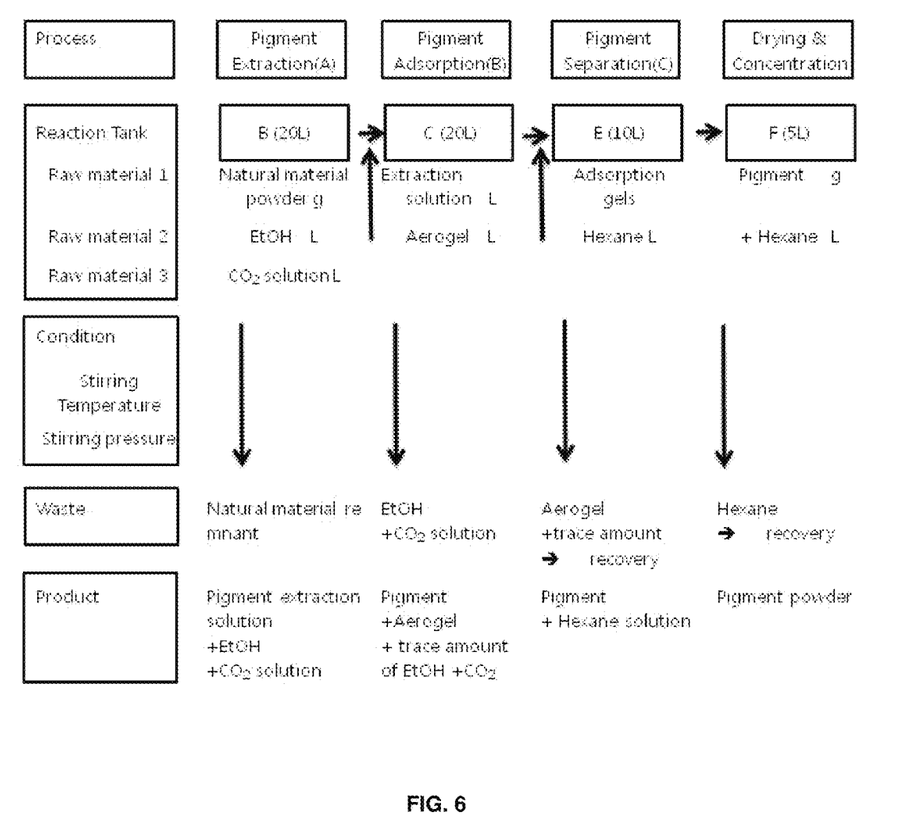
FIG. 6 shows a flow chart of the system for separating oil-soluble pigment and water-soluble pigment from natural material by the above experiments.

IV. Separation Production System of Oil-Soluble Pigment and Water-Soluble Pigment FIG. 6 represents a flow chart of a system for separating oil-soluble pigment and water-soluble pigment extracted from natural material through the above experiments. The process of basic separation of oil-soluble pigment and water-soluble pigment from natural material has been practiced with organic solvent extraction methods, failing to meet the GMP standard and causing various problems in safety management. However, these problems can be easily solved by separating the oil-soluble substance and the water-soluble substance from natural material using the porosity and hydrophobicity of the aerogels.

The separation method according the present invention for separating the oil-soluble substance and the water-soluble substance from natural material using aerogels comprises the steps of (A) extracting pigment, (B) adsorbing pigment, (C) separating pigment, and (D) drying and concentrating.

1. The Step (A) of Extracting Pigment

Figure 7:
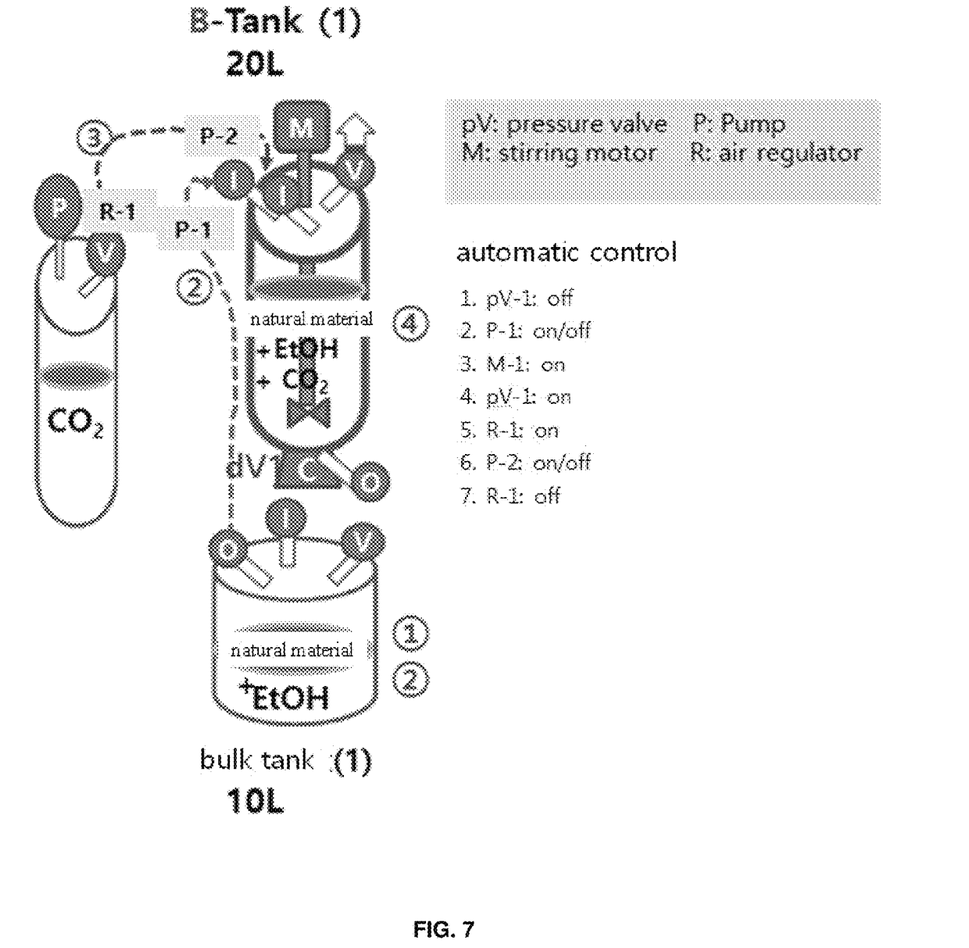
FIG. 7 is a schematic diagram showing a pigment extraction step of the system for separating oil-soluble pigment and water-soluble pigment from natural material according to the present invention.

FIG. 7 is a schematic diagram showing a pigment extraction step of the system for separating oil-soluble pigment and water-soluble pigment from natural material according to the present invention. It is desirable to use the natural material in the form of powder, which is dissolved in ethanol, and the dissolved natural material may be placed in a natural material tank for a certain period so that it has a predetermined CO2 partial pressure. To this end, the pigment extraction apparatus comprises a natural material tank (B-Tank(1)), a stirrer (M) formed inside the natural material tank, a pump (P) and an air regulator (R) connected to the natural material tank and supplying gas to maintain a proper partial pressure of CO2, and a pressure valve (pV) for regulating the same.

The natural material powder is accurately measured with a microbalance and added into the natural material tank containing ethanol, followed by completely suspending by means of a stirrer (M). After stirring, using a pump (P), an air regulator (R) and a pressure valve (pV), the natural material tank may have a stable partial pressure of CO2, and the tank pressure regulating valve becomes shut off. The above procedure can be automatically controlled.

2. The Step (B) of Adsorbing Pigment

Figure 8:
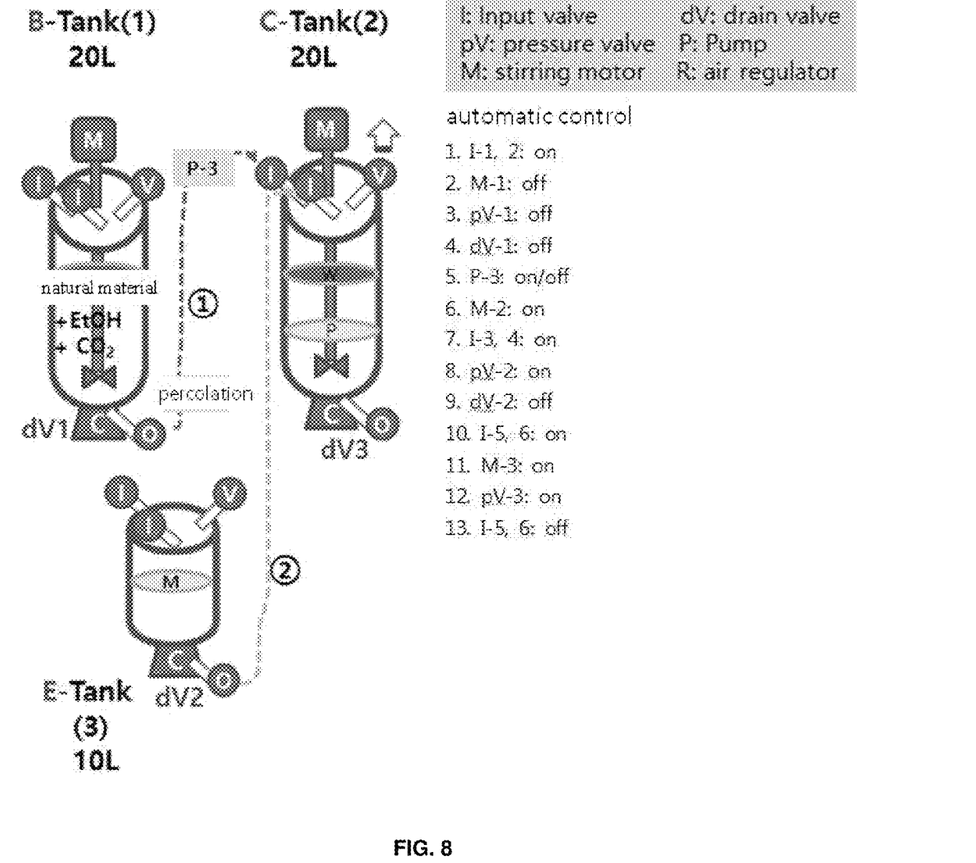
FIG. 8 is a schematic diagram showing a pigment adsorption step of the system for separating oil-soluble pigment and water-soluble pigment from natural material according to the present invention.

FIG. 8 is a schematic diagram showing a pigment adsorption step of the system for separating oil-soluble pigment and water-soluble pigment from natural material according to the present invention. When the natural material is leached for a period of time, the leaching solution is mixed with aerogels to adsorb the pigment.

First, the leaching solution is transferred to the adsorption tank (C-Tank(2)). At this time, the input valve (I) is shut off and the pressure valve (pV) and the lower drain valve (dV) are opened to put the leaching solution into the adsorption tank, wherein the leaching solution is transferred and measured coincidentally using a controlled volume pump, and the impurities therein can be removed by filtration during the transfer. When the transfer is completed, the stirring operation is performed using a stirrer (M) formed inside the adsorption tank (C-Tank(2)).

The aerogel powder previously filled in the aerogel tank (E-Tank(3)) is transferred to the adsorption tank (C-Tank(2)). In the mean time, the input valve (I) is shut off to fill the pressure, and a constant pressure is applied to transfer the aerogels to the adsorption tank (C-Tank(2)). In the adsorption tank, while the aerogels are being transferred, the natural material leaching solution is continuously stirred. And when the transfer of aerogels are completed, a stirring operation is performed during a predetermined period after shutting off the input valve(I).

3. The Step (C) of Separating Pigment

Figure 9:
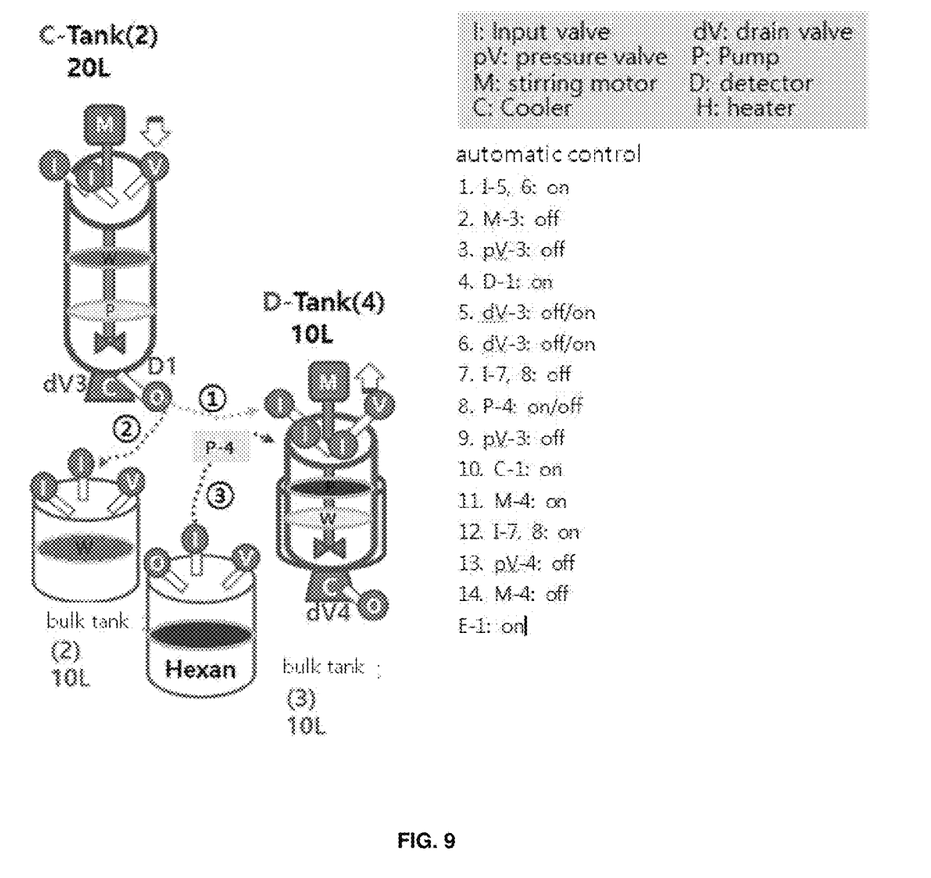
FIG. 9 is a schematic diagram showing a pigment separation step of the system for separating oil-soluble pigment and water-soluble pigment from natural material according to the present invention.

FIG. 9 is a schematic diagram showing a pigment separation step of the system for separating oil-soluble pigment and water-soluble pigment from natural material according to the present invention. After adsorbing the hydrophobic substance with aerogels, the stirring is stopped for a predetermined period of time to allow the supernatant solution layer to separate from the aerogels. When the layer seperation is completed, the pressure valve (pV) and the drain valve (dV) are opened to transfer the supernatant solution layer to the supernant solution tank (Bulk-tank (2)) and to transfer the aerogels to the pigment separation tank (D-Tank (4)).

Hexane is added to the pigment separation tank (D-Tank (4)) containing aerogels in order to separate oil-soluble substance. At this time, a cooler (D) is mounted on the pigment separation tank to cool the reactants to remain at the temperature of −20° C., followed by stirring using a stirrer (M). After stirring at atmospheric pressure for a certain period of time, the reactants are allowed to stand at −20° C. for a predetermined time, so that the layer is separated. Then using an elevator, the tank is moved upward.

4. The Step (D) of Concentrating Pigment

Figure 10:
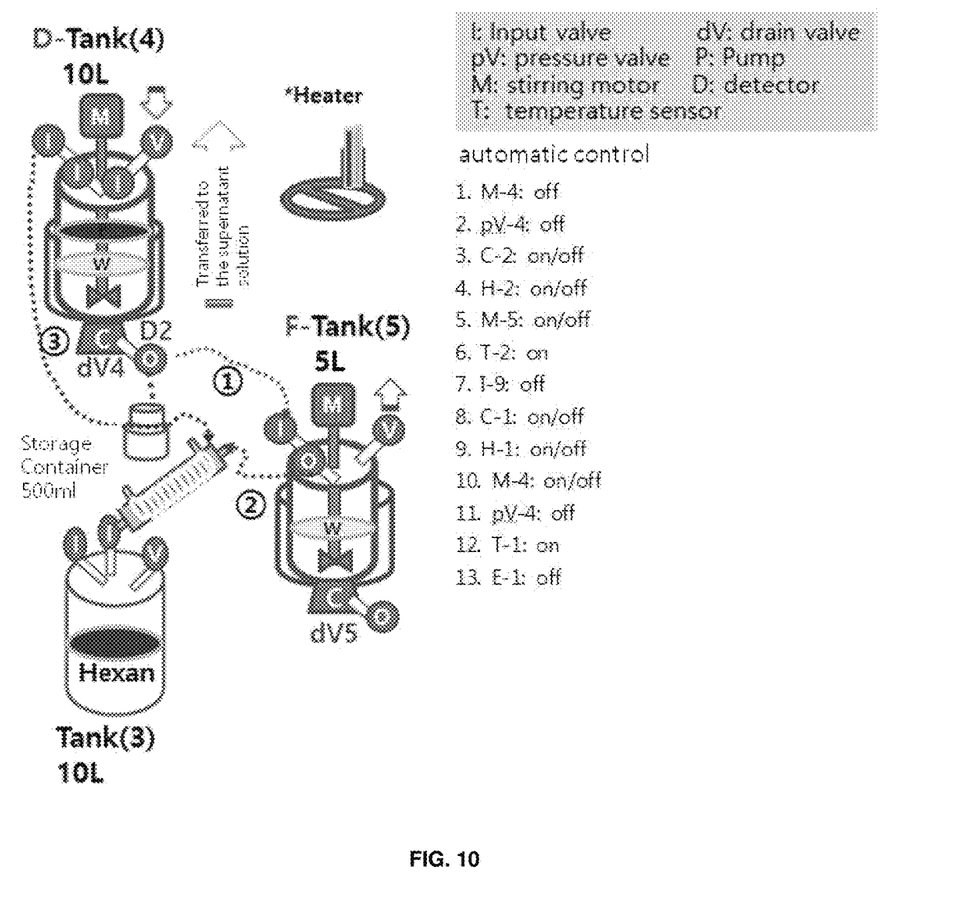
FIG. 10 is a schematic diagram showing a drying and concentration step of the system for separating oil-soluble pigment and water-soluble pigment from natural material according to the present invention.

FIG. 10 is a schematic diagram showing a drying and concentration step of the system for separating oil-soluble pigment and water-soluble pigment from natural material according to the present invention. The oil-soluble substance is dissolved in a hexane layer. The waste aerogels are transferred to the regeneration tank (F-Tank(5)) cooled to −20° C. by opening a drain valve (dV) of the pigment separation tank (D-Tank(4). The upper part of the regeneration tank is equipped with a heater to heat the waste aerogels, and the stirrer (M) is operated to stir aerogels to volatilize the remaining hexane. The volatilized hexane is recovered through a heat exchanger.

The hexane layer containing the oil-soluble substance remains at −20° C. to be stored. Thereafter, the heater formed inside the pigment separation tank (D-Tank(4)) is operated to volatilize the hexane and the volatilized hexane is recovered with a heat exchanger. The tank is moved downward using an elevator and dried, and the dried substance is recovered with the opening of drain valve (dV).

5. The Step (E) of Separating Water-Soluble Pigment

As seen in FIG. 9, non-absorbed water-soluble pigment onto the aerogels even after the pigment adsorption step (B) is moved to the bulk tank along the supernatant solution to separate the pigment. After the stirring step is completed and the layers are separated, the supernatant solution is transferred to the supernatant solution tank (bulk-tank (2)) by opening the pressure valve (pV).

6. The Step (F) of Concentrating Water-Soluble Pigment

The water-soluble pigment from the step (E) is dried under reduced pressure, and dried and concentrated into powder.

As described above, by using the present separation method of separating oil-soluble pigment and water-soluble pigment by means of aerogels, the safety management problem possibly caused by the use of organic solvent can be solved, and at the same time, compared with the separation purification method using organic solvent, the yield is increased more than 5% in the experiment stage, and more than 800% in the production stage, confirming the economic effect.

The present method of separating oil-soluble pigment and water-soluble pigment from natural material using aerogels and the apparatus therefor enhance a method of separating the initial substance from natural material for pharmaceuticals, food, cosmetics, etc. facilitating safer and more efficient production process, compared to the conventional separation method. Therefore, the present invention is industrially useful and effective.

What is claimed is:

1. A method of separating oil-soluble substance and water-soluble substance from natural material using aerogels, the method comprising the steps of:
    (A) immersing a natural material in a leaching solvent;
    (B) mixing hydrophobic silica aerogel with the leaching solvent in an adsorption tank to obtain a mixed solution and stirring the mixed solution such that oil-soluble substance in the mixed solution is adsorbed to the hydrophobic silica aerogel in the mixed solution while water-soluble substance remains in the leaching solvent of the mixed solution without being adsorbed to the hydrophobic silica aerogel;
    (C) stopping the stirring of the mixed solution and waiting until an aerogel layer and a leaching solvent layer are separated within the adsorption tank;
    (D) opening a drain and pressurizing the adsorption tank to transfer the aerogel layer from the adsorption tank to a separation tank, and transferring the leaching solvent layer from the adsorption tank to a supernatant solution tank;
    (E) adding hexane into the separation tank and waiting until a hexane layer and the aerogel layer are separated within the separation tank, wherein the oil-soluble substance from the aerogel layer is dissolved in the hexane layer;
    (F) opening a drain and pressurizing the separation tank to transfer the aerogel layer from the separation tank to a regeneration tank; and
    (G) heating the separation tank containing the hexane layer such that volatilized hexane is recovered with a heat exchanger while the oil-soluble substance that was dissolved in the hexane remains in the separation tank for retrieval, wherein step (B) is performed in a condition that carbon dioxide partial pressure of 36-44 mmHg is applied in the adsorption tank.

2. The method according to claim 1, further comprising the steps of:
    drying and concentrating the leaching solvent transferred into the supernatant solution tank in step (D) to obtain the water-soluble substance.

3. The method according to claim 1, wherein the leaching solvent in the step (A) is 95% ethanol, and wherein the hexane in the separation tank in step (E) is cooled to $-20°$ C.

4. The method according to claim 1, wherein the oil-soluble substance is hesperetin, and wherein the water-soluble substance is hesperidin.

* * * * *